United States Patent [19]

Toman

[11] 3,950,754
[45] Apr. 13, 1976

[54] METHOD OF TRANSMITTING GLIDE SLOPE NAVIGATION SIGNALS FOR AIRCRAFT

[75] Inventor: Donald J. Toman, Pleasantville, N.Y.

[73] Assignee: Tull Aviation Corporation, Armonk, N.Y.

[22] Filed: May 28, 1974

[21] Appl. No.: 473,408

[52] U.S. Cl. ......... 343/108 R; 343/108 M; 343/109
[51] Int. Cl.² ........................ G01S 1/18; G01S 1/44
[58] Field of Search.... 343/109, 108 R, 107, 108 M

[56] References Cited
UNITED STATES PATENTS 3,774,214  11/1973  Toman et al. ................. 343/108 M

*Primary Examiner*—T. H. Tubbesing
*Assistant Examiner*—Richard E. Berger
*Attorney, Agent, or Firm*—Curtis Ailes

[57] ABSTRACT

A multiple element antenna array provides a separate beam of carrier signal from each element in a pattern of beams spaced at different angles above the horizon. The array is adjusted upwardly to avoid obstructions on the horizon, and a program of modulation is applied to the separate beams to define the desired glide slope path while compensating for the mechanical upward adjustment of the array.

10 Claims, 5 Drawing Figures

METHOD OF TRANSMITTING GLIDE SLOPE NAVIGATION SIGNALS FOR AIRCRAFT

CROSS-REFERENCE TO RELATED U.S. PATENTS

U.S. Pat. No. 3,774,214 issued Nov. 20, 1973 to Donald J. Toman and Lloyd J. Perper for SCANNING BEAM GUIDANCE METHOD AND SYSTEM and assigned to the same assignee as the present application.

U.S. Pat. No. 3,793,597 issued Feb. 19, 1974 to Donald J. Toman for MODULATION SYNTHESIS METHOD AND APPARATUS and assigned to the same assignee as the present application.

This invention relates to an improved method for transmitting error-free glide slope signals to an aircraft for instrument landing of the aircraft. The method is particularly useful for difficult sites having uneven terrain.

One of the most serious problems in the operation of conventional UHF glide slope aircraft instrument landing equipment is the requirement that the terrain must be very flat in a relatively large area of 2,000 feet in radius under the glide slope course. This requirement arises from the fact that the ground is used as a reflector to transmit portions of the glide slope signals to the aircraft. Additionally, obstructions considerably beyond the 2,000 foot dimension often cause serious signal distortion problems. This imposes a serious economic limitation on the installation of instrument landing system equipment. Not only is it necessary to find or produce a very large, very level area for the approach end of the runway, but it is necessary to carefully maintain the area by periodically cutting vegetation which otherwise tends to modify the reflected signals.

At sites that do not have flat land in front of the runway, special antenna arrays have been tried which do not depend upon reflected signals. However, such special antenna arrays are relatively expensive, and they do not solve all of the problems of difficult sites. For instance, at UHF frequencies, the near field of the signal extends so far out that interference occurs through the presence of relatively distant objects protruding above the horizon so that reliable and accurate operation is difficult.

Various proposals have been made for microwave frequency systems employing scanning beams for the transmission of the glide slope navigation information. Such systems do not rely upon the ground as a reflector, and, at microwave frequencies, the near field does not extend out so far so as to avoid some of the problems of the conventional UHF systems. However, physical obstructions beneath the glide path are still a problem. Some prior systems have used the principle of simply cutting off the bottom of the scan pattern in order to avoid interception by obstacles above the horizon. However, with such prior scanning beam microwave systems, the information is conveyed to the receiver by the relative motion of the signal in scanning past the receiver. Thus, cutting off the bottom of the scan seriously reduces the signal available to the receiver below the glide slope course plane. Because of this, the prior scanning beam systems have very little ability to accommodate for obstructions above the horizon when dealing with the conventional glide slope angle of 3°, and the conventional course width of plus or minus 0.72° above and below the 3° glide path.

Accordingly, it is an object of the present invention to provide an improved and economical method for the production of glide slope signals of excellent quality in difficult sites having substantial obstructions beneath the glide path.

Other objects and advantages of the invention will be apparent from the following specification and the accompanying drawings.

In carrying out the invention there is provided a method of transmitting radio guidance signals for defining a glide slope path for aircraft comprising aligning a multiple element antenna array to provide a separate beam of carrier signal radiation from each element in a pattern of beams spaced at different angles above the horizon in the general direction in which the glide slope path is to be defined, mechanically adjusting the angular position of the entire multiple element antenna array so that the element producing the lowermost beam is aimed high enough to avoid any substantial line-of-sight obstruction to the lowermost beam to minimize reflections from the obstruction while substantially filling the air space above the obstruction with a guidance signal, applying radio carrier frequency energy to the antenna elements, applying a program of modulation to the radio carrier energy for each of the elements to define the glide slope path, the program of modulation being selected to establish a glide slope path having a desired glide slope angle while compensating for the mechanical adjustment of the antenna array to avoid line-of-sight obstructions.

Figure 5:
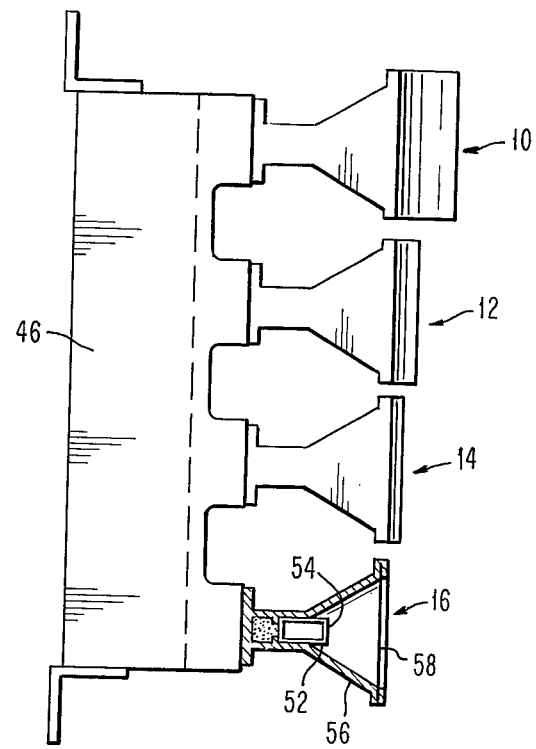
Figure 4:
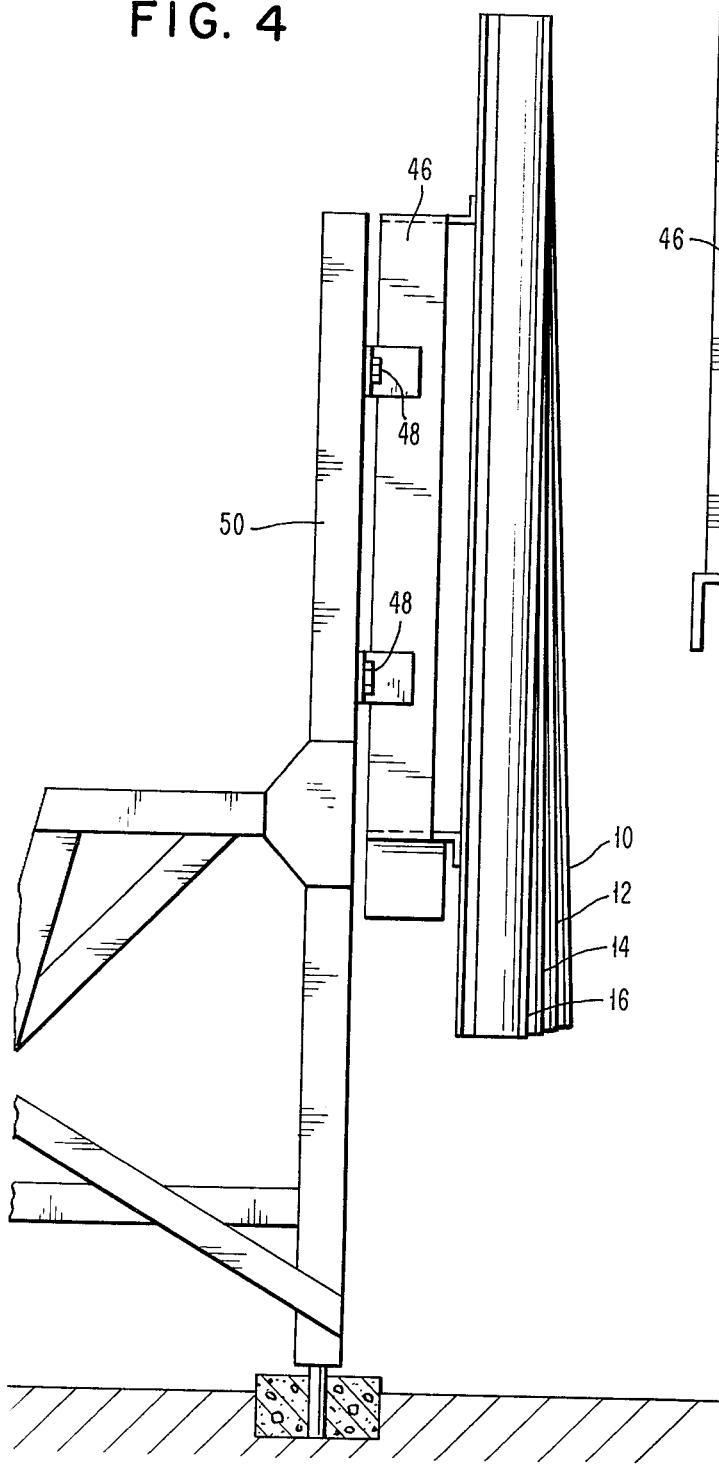
FIG. 4 is a side view of an antenna array which may be employed in carrying out the invention.

And FIG. 5 is a top view of the antenna array of FIG. 4.

Figure 1:
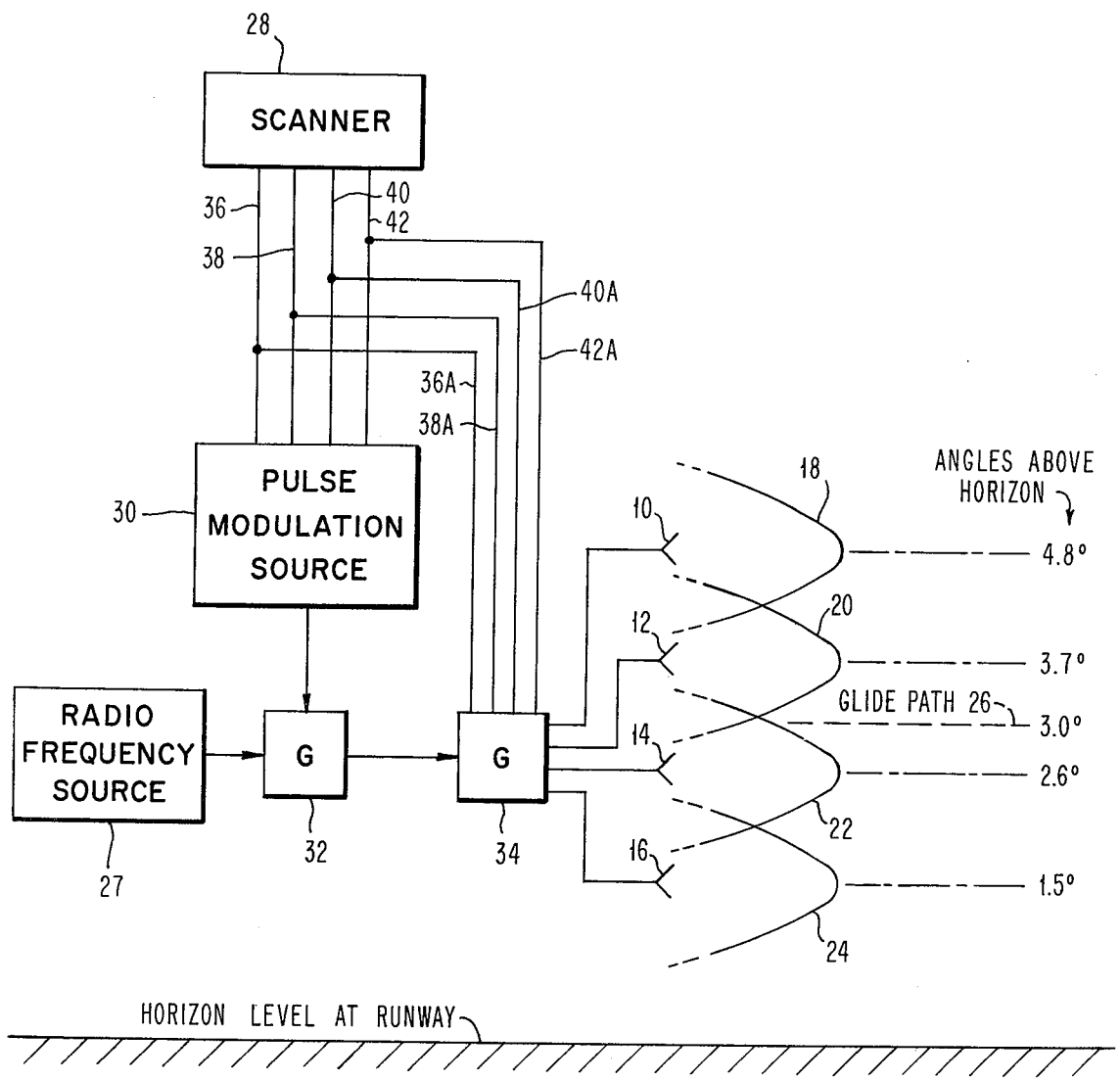
FIG. 1 is a schematic circuit diagram of a system which may be used in carrying out the method of the present invention combined with a schematic representation of the signal beams provided by the system.

Referring more particularly to the drawings, in carrying out the present invention, in a preferred form thereof, there is provided a glide slope signal transmission system illustrated schematically in FIG. 1. The transmission system provides navigation signals to an array of four separate navigation signal antenna elements 10, 12, 14, and 16. These antenna elements (sometimes referred to below simply as antennas) are schematically positioned to correlate with their separate contributions to a combined signal pattern which is radiated by the combination of antenna elements. Thus, the respective antenna elements 10–16 are effective to set up individual carrier signal radiation beams schematically indicated at 18, 20, 22, and 24. The individual beams 18–24 contain modulation which defines a glide plane in space indicated by the dotted line 26. The radio signals from all of the antenna elements 10–16 are at the same carrier frequency. However, the navigation plane 26 is defined by providing different proportions of modulating frequency tones at 90 and 150 Hz in the respective beams. Thus the 150 Hz modulation predominates in the beams 22 and 24, and the 90 Hz modulation predominates in the beams 18 and 20. The carrier frequency energy is switched in a sequence from one antenna element to another, and consequently, the beams 18–24 are sometimes referred to collectively as constituting a switched scanning beam, and the individual beams 18–24 are referred to as providing individual switched portions of the scanning beam.

The arrangement of the antennas 10–16 and the beams 18–24 in this drawing are schematic representations only. The actual radiation beams are directed outwardly in a fan configuration, rather than in a parallel beam configuration as illustrated. The separations of the beams 18–24 in the vertical dimension in this drawing are thus representative of angular separations of the beams in the actual radiation pattern. As indicated in the angular scale to the right of the drawing, typical angular orientations of the beams above the horizon are 1.5°, 2.6°, 3.7° and 4.8°. The glide slope course plane is at the conventional 3° above the horizon. The word "horizon" is used in this specification in a scientific sense, as used in astronomy, to mean a plane tangent to the earth's surface at a particular point (here the surface of an airport runway). This is sometimes referred to more distinctively as the "sensible horizon."

The beams are of uniform vertical width and at center-to-center vertical spacings of 1.1°. The beams are preferably relatively narrow in vertical dimension, and relatively wide in the horizontal dimension to provide wide angle coverage in azimuth, accurately defining the glide slope plane over a relatively wide azimuth sector.

More specifically, the relatively narrow vertical dimension of each beam is preferably under two degrees at the minus three decibel signal energy level down on each side of the center line from the peak energy level at the center line.

The nominal vertical beam width in a preferred embodiment of the invention is 1.87°. It has been found that, in order to avoid undesirable reflections from the ground, the center line of the lowest beam should be maintained at an angle above the horizon of about eighty percent of the vertical beam width. In the preferred embodiment of the present invention, this value is maintained. Thus, the center line of the lowest beam 24 is aimed at a nominal plus 1.5°, which is 80 percent of the beam width of 1.87°.

In the preferred embodiment of the invention, the various beams are radiated from the various antenna elements 10–16 by rapidly switching radio frequency energy from one antenna element to another. The energy may come from a single radio frequency source 27. This arrangement is referred to as a switched scanning beam system, and it is carried out in accordance with the basic teachings of a related U.S. Pat. No. 3,774,214 issued Nov. 20, 1973 for a "SCANNING BEAM GUIDANCE METHOD AND SYSTEM," and assigned to the same assignee as the present application. The disclosure of that patent is primarily related to the localizer (azimuth guidance) function of an instrument landing system. However, the same principles are directly applicable to the present glide slope system. The present invention will often be practiced in conjunction with an associated localizer for azimuth guidance, and generally following the teachings of the above patent.

In addition to the radio frequency source 27, the transmitter system feeding the antennas 10–16 includes a scanner 28, a pulse modulation source 30 controlled by the scanner through connections 36, 38, 40, and 42, and a modulator gate 32 controlled by the pulse modulation source 30. The transmitter also includes a gating device 34 by means of which the modulated radio frequency signals are gated to the respective antenna elements 10–16. The gating device 34 is also controlled by the scanner 28 through branch control connections 36A, 38A, 40A, and 42A. The modulation provided by the pulse modulation source 30 is preferably a pulse duration modulation in which the modulation is synchronized with the scanning of the beam by the switching of the radio frequency source beam energy from one antenna element to another. Thus, as the radio frequency is switched to each antenna element 10–16, the duration of the pulse (actually a burst of radio frequency energy) is carefully controlled at gate 32 by the pulse modulation source 30 to provide the desired modulation on that particular beam. Since the pattern of modulation to be provided on each of the various beams is constant, there is a complete repetition of the modulation sequence and therefore the different modulation signals required for the different sequences of pulses for each beam are built into the pulse modulation source. Preferably, the pulse modulation is carried out by means of digital circuits and by means of digital synthesis of the modulation in accordance with the teachings of a prior U.S. Pat. No. 3,793,597 issued on Feb. 19, 1974 to Donald J. Toman for a MODULATION SYNTHESIS METHOD AND APPARATUS, and assigned to the same assignee as the present application.

The scanner 28 is operable to issue timing signals in a sequence on the output lines 36–42 to control the gating of energy respectively to the antenna elements 10–16, and to control the operation of the pulse modulation source 30 to provide the appropriate modulation in synchronism with the switching of energy to the respective antenna elements. The scanner provides an output on only one of the output connections 36–42 at any one time. For instance, at the interval when the scanner provides an output at connection 36, that output is received by the pulse modulation source 30 and also by the antenna switching gate 34. As a result, the energy is modulated and switched through the four-way antenna switching gate 34 to the antenna element 10. In similar fashion, scanner signals on the various switching gate 34 inputs 36A–42A cause the energy to be switched respectively to the antenna elements 12, 14, and 16. The four-way switching gate 34 may be a microwave switch of the type referred to as a shunt-diode switch, and may employ PIN diodes.

As previously mentioned above, the glide path 26 is defined by the modulation applied to the different beams 18–24. Thus, the glide path is determined by the combination of the respective angular positions of the different beams above the horizon and the mixtures of modulation applied to each of the beams, the 150 Hz (fly up signal) modulation predominating in the beams 22 and 24 which appear below the glide path 26, and the 90 Hz (fly down signal) modulation predominating in the beams 18 and 20 above the glide path 26. However, the modulation patterns applied to the beams above and below the glide path 26 need not be perfectly symmetrical, and the glide path 26 need not necessarily occur at an angle which is exactly spaced between the center lines of the beams 20 and 22. As indicated in FIG. 1, this is not the case in the example given, for an angle midway between the center lines of beams 20 and 22 would be 3.15° instead of 3.0° as shown. It is a feature of the invention, following the teachings of the aforementioned prior U.S. Pat. Nos. 3,774,214 and 3,793,597, that the programming of the pulse modulation source 30 can be easily and simply changed to adjust the mixtures of the 150 Hz and 90 Hz tones on the individual beams to define the glide path 26 at any desired angle. The 150 Hz and 90 Hz modulation applied to the individual beams for the purpose of establishing the three degree glide path plane 26 pictured in FIG. 1 is shown by way of example in the following table. The table assumes a conventional 80 percent modulation of the carrier for the glide slope function, and the modulation index for the respective modulation frequencies is given in terms of the contribution of each modulation signal frequency to the total modulation:

TABLE I

| Beam Identification | 90 Hz Modulation Index | 150 Hz Modulation Index |
|---|---|---|
| 18 | 0.640 | 0.160 |
| 20 | 0.496 | 0.304 |
| 22 | 0.368 | 0.432 |
| 24 | 0.240 | 0.560 |

Figure 2:
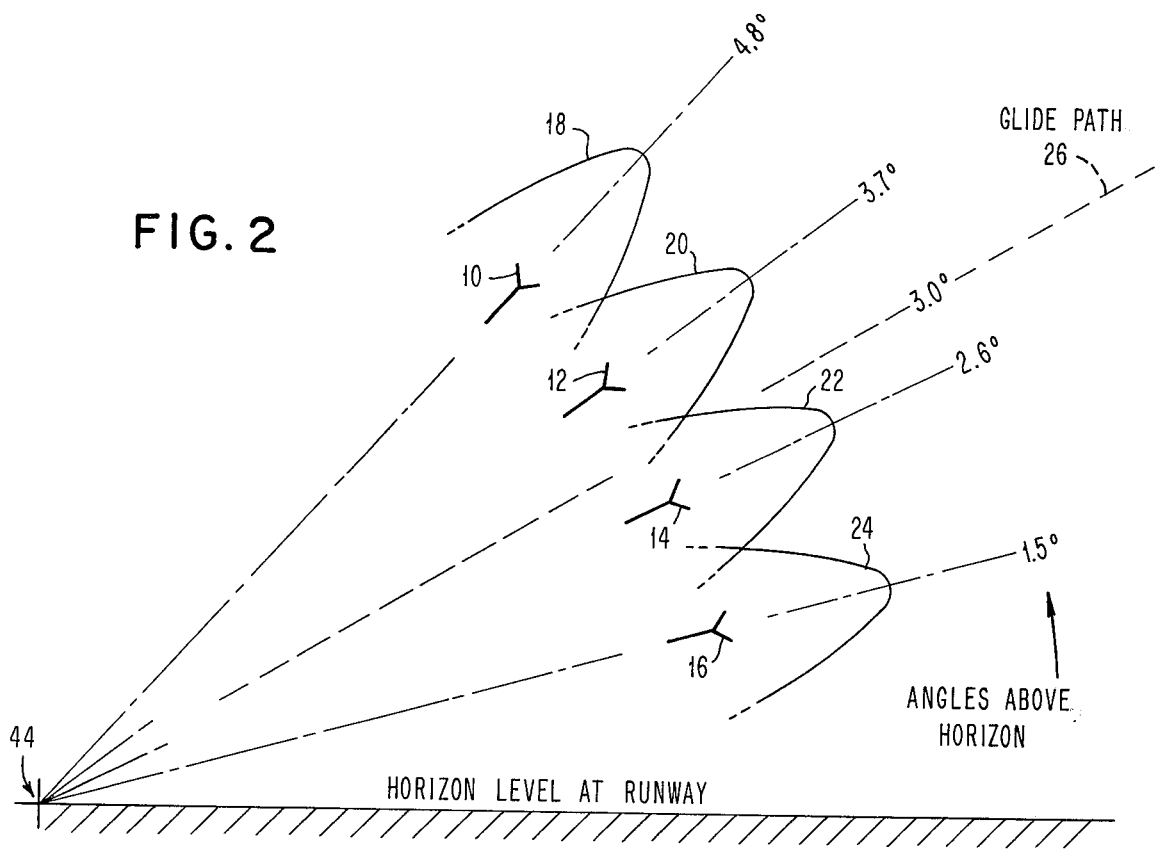
FIG. 2 is a schematic representation of the signal beams provided by the system of FIG. 1 presented in polar coordinate form.

FIG. 2 is a schematic polar coordinate representation of the physical positions of the antenna elements 10–16 and the beams 18–24 of FIG. 1. In this figure, the angular scale is greatly exaggerated in order to promote an understanding of the principles of the invention. However, the angles are shown in correct angular proportionality. The angles of the respective beam center lines, and the glide path 26, are illustrated about a common origin at the horizon level of the runway as indicated at 44. The center lines of the respective beams are angularly spaced above the horizon in positions corresponding to the positions shown in rectangular coordinates in FIG. 1. Also, the glide path 26 is illustrated at the same relative position.

Figure 3:
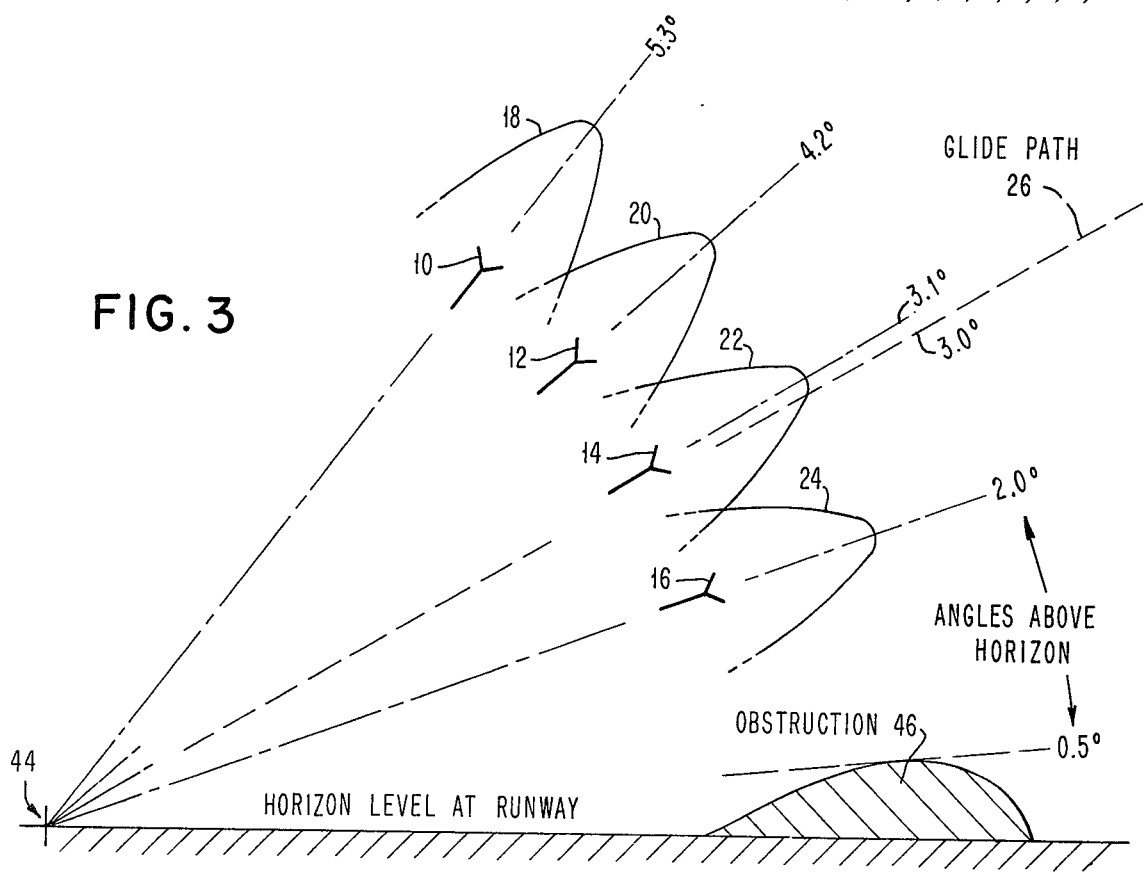
FIG. 3 is a schematic representation corresponding to FIG. 2, but showing the antenna array and the associated signal beams adjusted upwardly to avoid an obstruction.

FIG. 3 is a schematic diagram corresponding to FIG. 2, but illustrating the condition where an obstruction 46 is present at 0.5° above the horizon. The obstruction may be substantially beyond the end of the runway itself, and still cause serious distortions of the signal from the conventional ILS system. The obstruction may have a relatively gradual slope, almost constituting a continuous upward slant of the terrain, or it may be relatively abrupt. The gradual slope is most troublesome, but in either case, the obstruction will cause distortions of the signals. In prior art systems, such an obstruction would make a glide slope navigational aid completely unworkable. In the present invention, the signals of FIGS. 1 and 2 are easily modified to avoid the obstruction. In order to maintain the 80 percent beam width clearance between the obstruction and the center line of the bottom beam 24, the entire antenna array consisting of elements 10–16 is tilted upwardly by 0.5° so that the center line of the bottommost beam is at plus 2° above the horizon level, and the other beams are correspondingly raised to higher angles, as illustrated in FIG. 3. If the same programming signals were then applied to each of the antenna elements, the glide path 26 also would be raised by 0.5° to 3.5°. However, this is not desired, since the glide path is to be maintained at the standard 3.0°. Accordingly, in order to lower the glide path, the modulation is changed from the modulation previously stated in Table I to a new modulation program providing the modulation as given in the following table. Again, the table assumes an 80 percent modulation of the carrier, and the modulation index for the respective modulation frequencies is given in terms of the contribution of each modulation signal frequency to the total modulation:

TABLE II

| Beam Identification | 90 Hz Modulation Index | 150 Hz Modulation Index |
|---|---|---|
| 18 | 0.704 | 0.096 |
| 20 | 0.560 | 0.240 |
| 22 | 0.432 | 0.368 |
| 24 | 0.304 | 0.496 |

It is observable in the above table that since the 3.0° glide path is below the center line of the beam 22, that beam is now modulated with a slight preponderance of 90 Hz fly down signal rather than a predominance of 150 Hz fly up signal as previously.

The sensitivity of the pattern of signals, that is the rate at which the ratio of the 90 and 150 Hz fly down and fly up modulation varies in relation to shifts in position away from the glide path 26 are such as to provide a nominal path width of plus or minus 0.72° on each side of the glide path 26. This corresponds to a difference in depth of modulation of 0.175 between the 90 and 150 Hz modulation signals, and corresponds to a full scale deflection of the standard aircraft glide slope indicator instrument.

The physical adjustment of the antenna, and the electrical adjustment of the programming may be adapted to exact accommodation for obstructions at angles in the entire range from 0° up to as much as 0.75°. In each case, the physical angle of the antenna array, and the electrical programming of the signals applied to the antenna array elements are suitably adjusted to accommodate for the angle of the obstruction in order to maintain the best possible signal pattern within the space available above the obstruction angle.

FIG. 4 is a side view of a physical antenna array which is capable of providing the signals discussed above when transmitted with a radio carrier signal at frequencies in the order of 5,200 MHz. The radiating elements 10–16 consist of substantially vertically arranged slotted wave guides positioned side by side. Each wave guide is approximately 8 feet in length and designed to provide vertical polarization. The wave guides are typically fed from the bottom end, and the loading slots in each wave guide are substantially identical to provide a slight upward "squint" angle of about 1.3° away from a direction normal to the front face of the wave guide. Thus, the element 16 for the lowermost beam, will be tilted upwardly at an angle of about 0.2° when no obstructions are present to provide a total upward slant to the beam of 1.5°, as illustrated in FIGS. 1 and 2. The other wave guides are tilted upwardly at 1.1° intervals by appropriate forward displacement at the bottom, as illustrated in the drawing.

All of the wave guides are mounted and supported upon a common mounting base 46 which is fastened by suitable mounting bolts at 48 to a stationary supporting frame 50. The elevation angle of the entire array is adjustable by adjustment at the mounting bolt connections 48 to achieve the desired elevation angles for the beams to clear obstructions as described above.

FIG. 5 is a top view of the antenna array of FIG. 4 enlarged to approximately twice the scale of FIG. 4, but showing only the mounting base 46 and the radiating elements 10–16. Element 16 is shown in section in order to reveal details of the wave guide construction.

In the sectional view of radiating element 16, the wave guide itself has a rectangular cross section as indicated at 52. An electrical industries association (EIA) standard WR-187 wave guide may be used for this purpose. The loading slots are cut into one of the narrow (edge) sides indicated at 54. These loading slots may preferably be cut in a direction which is generally transverse to the center line of the wave guide and the number and arrangement of the slots is preferably designed to achieve the desired beam characteristic in accordance with principles taught in standard textbooks on slotted wave guide design. For instance, see the *ANTENNA ENGINEERING HANDBOOK* published by McGraw-Hill in 1961 and edited by Henry Jasik. Chapter 9 is particularly pertinent. The radiating element also includes a beam shaping horn structure indicated at 56. Over the end of the horn there is attached a "radome," a non-metallic protective cover 58 which does not absorb the useful signals, but which provides weather protection to the radiating element.

While this invention has been shown and described in connection with a particular preferred embodiment, it is apparent that various changes and modifications, in addition to those mentioned above, may be made by those who are skilled in the art without departing from the basic features of the invention. Accordingly, it is the intention of the applicant to protect all variations and modifications within the true spirit and valid scope of this invention.

I claim:

1. A method of transmitting radio guidance signals for defining a glide slope path for aircraft comprising
aligning a multiple element antenna array to provide a separate beam of carrier signal radiation from each element in a pattern of beams spaced at different angles above the horizon in the general direction in which the glide slope path is to be defined,
mechanically adjusting the angular position of the entire multiple element antenna array so that the element producing the lowermost beam is aimed high enough to avoid any substantial line-of-sight obstruction to the lowermost beam to minimize reflections from the obstruction while substantially filling the air space above the obstruction with a guidance signal,
applying radio carrier frequency energy to the antenna elements,
applying a program of modulation to the radio carrier energy for each of the elements to define the glide slope path,
the program of modulation being selected to establish a glide slope path having a desired glide slope angle while compensating for the mechanical adjustment of the antenna array to avoid line-of-sight obstructions.

2. A method as claimed in claim 1 wherein
said radio carrier frequency energy is transmitted at microwave frequencies.

3. A method as claimed in claim 1 wherein
the separate beams are radiated from separate slotted wave guide radiation elements.

4. A method as claimed in claim 3 wherein
the wave guide radiation elements are physically arranged at different relative angles to provide the radiation of the pattern of beams spaced at different angles above the horizon.

5. A method as claimed in claim 1 wherein
the modulation applied to the radio carrier energy signifies two different fixed tone modulation frequencies respectively signifying fly up and fly down information,
said modulation for fly up and fly down information being applied to the different beams in different relative proportions to provide a predominance of fly up signal below the glide path and a predominance of fly down signal above the glide path.

6. A method as claimed in claim 1 wherein
said guidance signals are transmitted by switching the radio carrier frequency energy in a sequence from one antenna element to another to thereby provide a switched scanning beam pattern of guidance signals.

7. A method as claimed in claim 6 wherein
the modulation is applied as pulse duration modulation by regulating the length of each pulse of carrier after the carrier energy is switched to each antenna element during the switched scan.

8. A method as claimed in claim 1 wherein
all of the separate beams are radiated directionally with a fan shape which is wide in the horizontal and narrow in the vertical direction.

9. A method as claimed in claim 8 wherein
the energy is radiated in at least three beams.

10. A method as claimed in claim 9 wherein
the radio frequency carrier energy is radiated in beams which are narrow in the vertical direction such that the width of each beam is less than 2° as measured on opposite sides of the peak of the beam and down 3 decibels from the energy at the peak.

* * * * *